May 7, 1957  E. J. MOSELEY  2,791,061
FLOATING TYPE MINNOW BUCKET
Filed Oct. 16, 1953
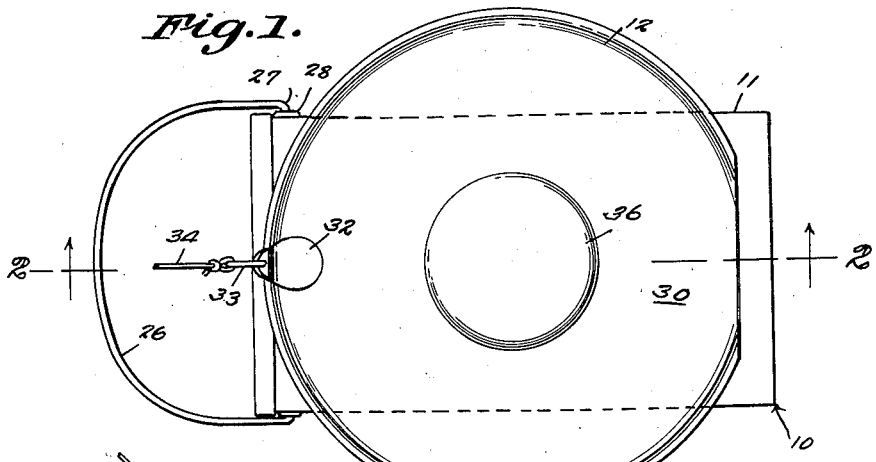
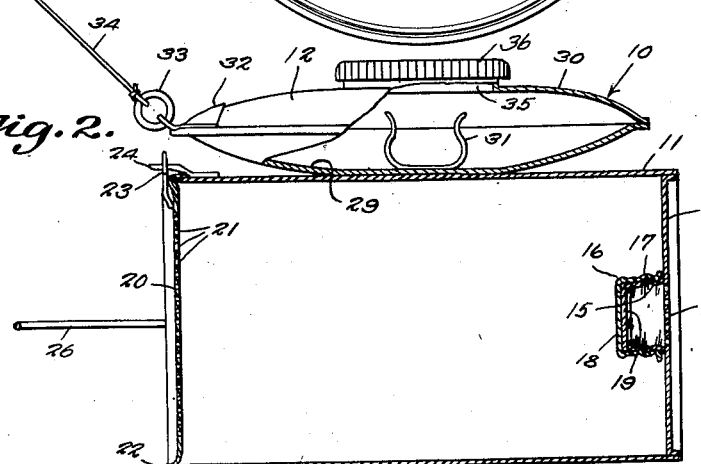
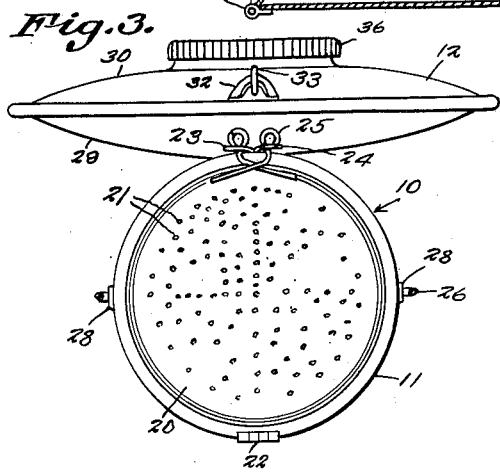
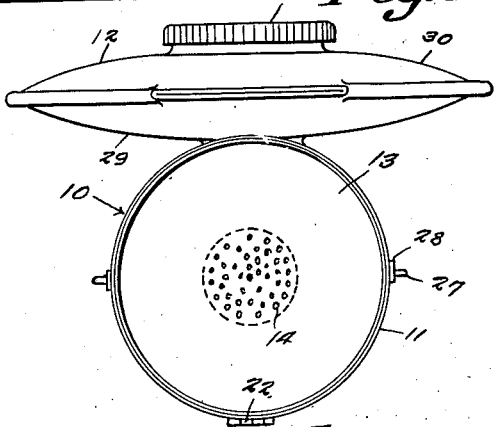
Earl J. Moseley
INVENTOR
BY *CA Snow & Co.*
ATTORNEYS.

2,791,061
FLOATING TYPE MINNOW BUCKET

Earl J. Moseley, Front Royal, Va.

Application October 16, 1953, Serial No. 386,476

1 Claim. (Cl. 43—56)

This invention relates to an improved floating type minnow bucket designed primarily for use by fishermen wading through the water during fishing, and when it is desirable to carry live bait such as minnows, crawfish, madtoms or the like which would perish unless supplied with water.

It is a primary object of this invention to provide an improved floating type minnow bucket of this kind to be more particularly described hereinafter which is provided with an apertured compartment for containing live bait, as minnows, and having a dry compartment, as the float of the minnow bucket, for carrying such sundry materials as the license certificate, matches, extra plugs, flies and a pocketbook, etc., thereby eliminating the necessity of a water carrier for the bait.

It is another object of this invention to provide an improved type minnow bucket of this kind having a perforated bait bucket and an improved float directly connected to the bucket with the float having a sealing cover whereby the float may serve the double purpose of a float for the bait bucket and a dry receptacle for the other items necessary for a fisherman.

It is a further object of this invention to provide an improved floating type minnow bucket of this kind which is light in weight to be easily carried about by a user both in and out of the water and has separate connections for a handle to carry the minnow bucket.

Referring to the drawings:

Fig. 1 is a top plan view of the improved floating minnow bucket constructed according to an embodiment of my invention.

Fig. 2 is a longitudinal section, of the floating minnow bucket partly broken away, taken on the line 2—2 of Fig. 1.

Fig. 3 is an end view of one end of the floating minnow bucket.

Fig. 4 is an end view of the other end of the floating minnow bucket.

Referring to the drawings the numeral 10 designates generally a floating minnow bucket constructed according to an embodiment of my invention, formed with an elongated tubular body 11 within which live bait may be contained for submerging in the water and a float 12 connected to that tubular body for floating the minnow bucket near the surface of the water within which the tubular body 11 is submerged.

The tubular body 11 is provided with a transverse end wall 13 fixed at one end and the end wall 13 is provided with perforations 14 near the center thereof through which the water, within which the body is submerged, may be free to pass into and out of the body.

A flange 15 is secured on one surface of the end wall 13 and extends inwardly of the body and on which a cap 16 is threadedly engaged for stopping the flow of water into or out of the tubular body 11. The cap 16 is provided with a circular flange 17 extending outwardly from the solid wall 18 of the cap whereby the water flowing through the perforations 14 may be stopped from entering or leaving the body 11 when the cap is threaded into place. A packing 19 is secured between the end solid wall 18 and the inner extremities of the inwardly extending flanges 15 to positively seal the cap 16 when it is threaded into engagement with the flange 15.

A perforated end wall 20 is disposed transversely of the body 11 at the opposite end thereof remote from the end wall 13, the perforated end wall 20 being provided with a plurality of perforations 21 throughout the area thereof.

The perforated end wall 20 is pivotally mounted on the end of the body 11 by a hinge 22 which is carried partially by the edge of the end wall 20 and by the edge and end of the tubular body 11 to provide for the swinging of the perforated end wall outwardly of the body. When the end wall 20 is swung to its open position, live bait may be placed within the tubular body 11 and for closing the end wall 20 a wire spring pressed latch 23 is fixed on the end wall opposite the hinge 22 to engage a spring pressed wire keeper 24. The spring pressed latch and keeper provide for the normal urging of the latch to a fastened engagement with the spring pressed keeper for holding the end wall 20 in a closed position with the live bait within the body 11. Loops 25 are formed on the ends of the wire latch members to provide for the finger engagement of a fisherman with the latch for opening and closing the end wall when and as desired.

When live bait is to be supported in a body of water, the end wall 20 is moved to its closed position and the cap 16 is removed allowing free circulation of water through the floating minnow bucket. When the floating minnow bucket 10 is used in supporting live bait out of a body of water, the cap 16 is screwed into position on the flange 17, and the body uprighted with end wall 13 providing the bottom of the minnow bucket. The water may be removed from the floating minnow bucket by initially opening the end wall 20 and unscrewing the cap 16 from the end wall 13 to provide for the disposition of the water from the floating minnow bucket.

A bail 26 is provided for the supporting of the floating minnow bucket exteriorly of the water and the bail 26 is formed of a length of wire with inturned portions 27 at the opposite ends thereof each of which is contained within a socket body 28 fixed to the body 11 adjacent to the end wall 20. When the end wall 20 has been opened and bait has been inserted within the tubular body and the perforated end 20 closed to maintain the bait within the body, the body 12 is then placed in a body of water where it is supported by the float 12.

The float 12 is secured to the tubular body 11, intermediate the opposite ends thereof by securing the bottom wall 29 of the float 12 directly to the outer surface of the tubular body 20. A float top wall 30 is fixed onto the edges of the bottom wall 29 so that the inner portion of the float is spaced outwardly from the bottom wall 29 and the tubular body 11 providing a water tight or dry compartment on the tubular body. A clip 31 is secured within the float between the bottom and top walls thereof and the clip 31 is adapted to secure a Thermos bottle within the float when the minnow bucket 10 is buoyantly supported in water. Sundry elements such as a fishing license, extra plugs, cigarettes, matches or the like are supported between the top and bottom walls of the float which are accessible through the opening 35 in the top wall 30, normally closed by the screw cap 36.

When the floating minnow bucket 10 is disposed in a body of water, the minnow bucket may be secured to an anchor or boat and a tow line attaching plate 32 is fixedly secured to the upper surface of the top front wall of the float 12 having a loop 33 loosely engaged therewith and loosely engageable by a tow line 34 so that the floating minnow bucket will not be lost or float away from a selected location chosen by the fisherman.

While the specific details of one embodiment of this invention have been herein shown and described, the invention is not confined thereto as changes and alterations may be made without departing from the spirit and scope thereof as defined in the appended claim.

I claim:

A floating minnow bucket comprising a cylindrical imperforate side wall, an imperforate bottom wall formed with a centrally disposed perforate area, a perforate top wall hinged to said side wall, an inwardly extending annular threaded flange encompassing said perforate area in said bottom wall, a cap removably engaging said flange, a hollow buoyant member fixed to said side wall, said member being formed of a pair of substantially disc-shaped oppositely dished plates secured together at their marginal edges, an annular threaded flange carried by one of said plates, a cap on said latter flange, and a resilient clip carried by the other of said plates in the space between said plates.

References Cited in the file of this patent
UNITED STATES PATENTS

| | | |
|---|---|---|
| 336,967 | Ward | Mar. 2, 1886 |
| 503,722 | Lewis et al. | Aug. 22, 1893 |
| 504,526 | Hemp | Sept. 5, 1893 |
| 521,244 | Muncaster | June 12, 1894 |
| 1,927,110 | Bannister | Sept. 19, 1933 |
| 2,159,718 | Spinner et al. | May 23, 1939 |
| 2,179,095 | Kelsey | Nov. 7, 1939 |
| 2,182,160 | Nelson | Dec. 5, 1939 |
| 2,522,017 | Bergman | Sept. 12, 1950 |
| 2,550,533 | Clark | Apr. 24, 1951 |
| 2,671,290 | Hamilton | Mar. 9, 1954 |